United States Patent Office 3,093,305
Patented June 11, 1963

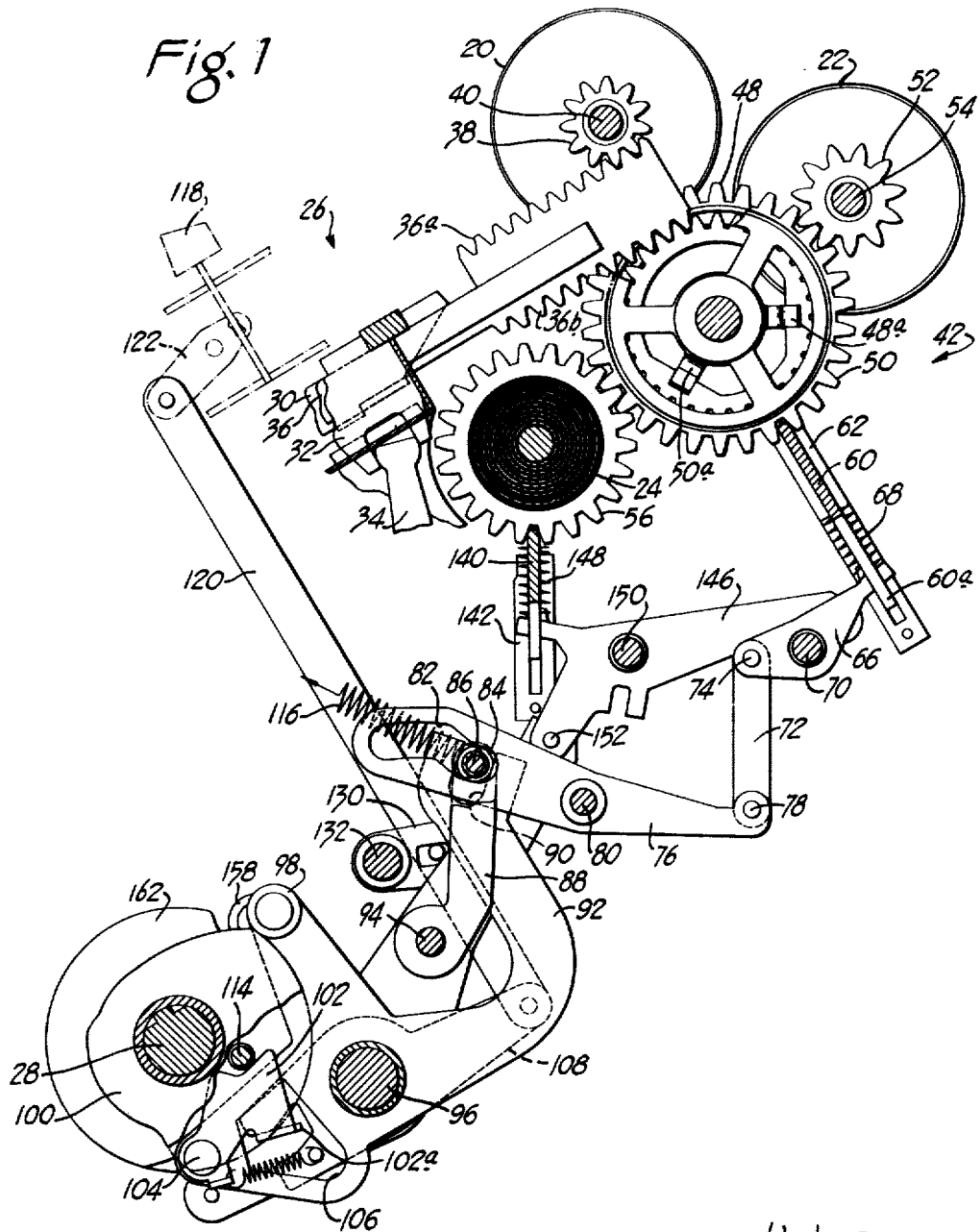

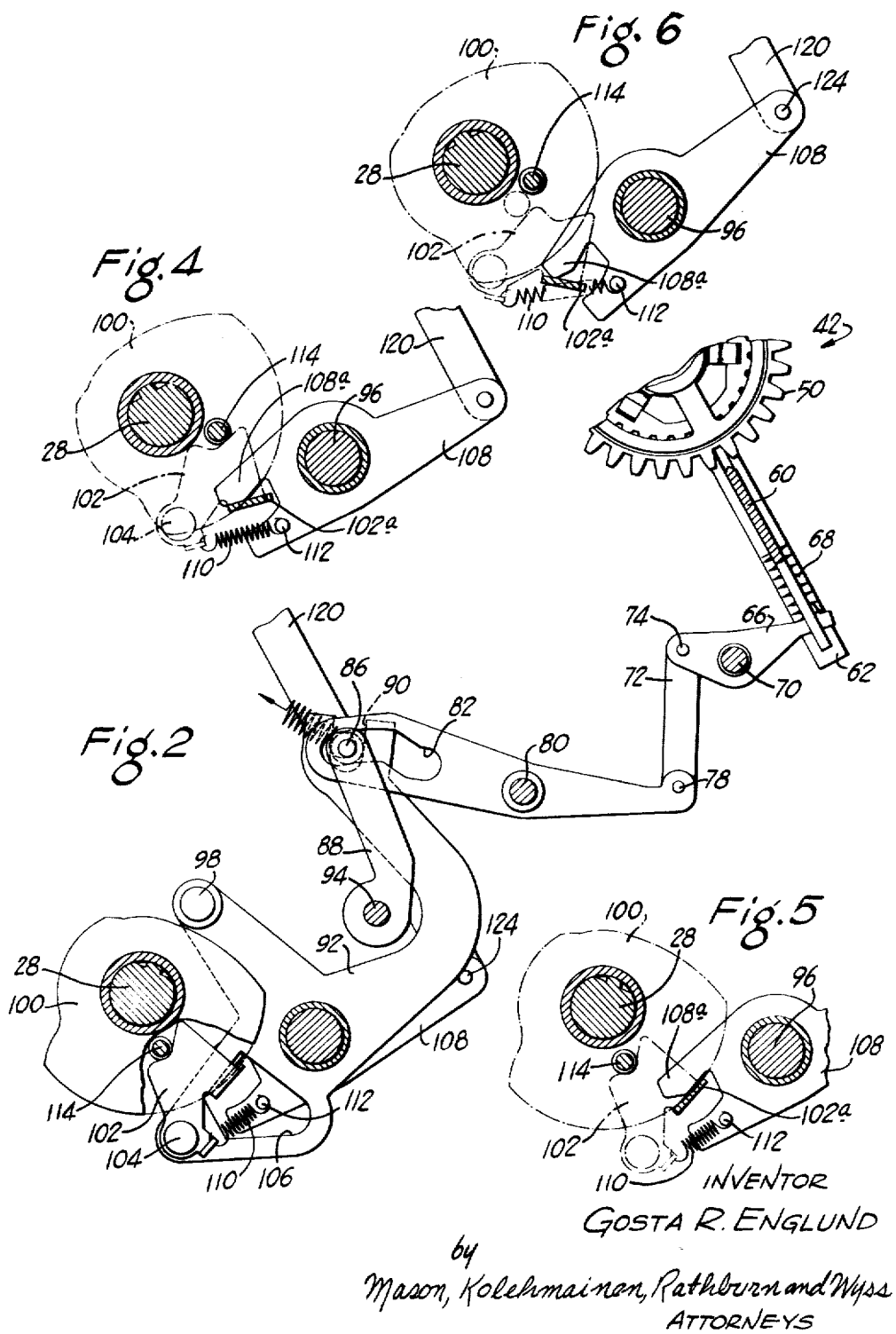

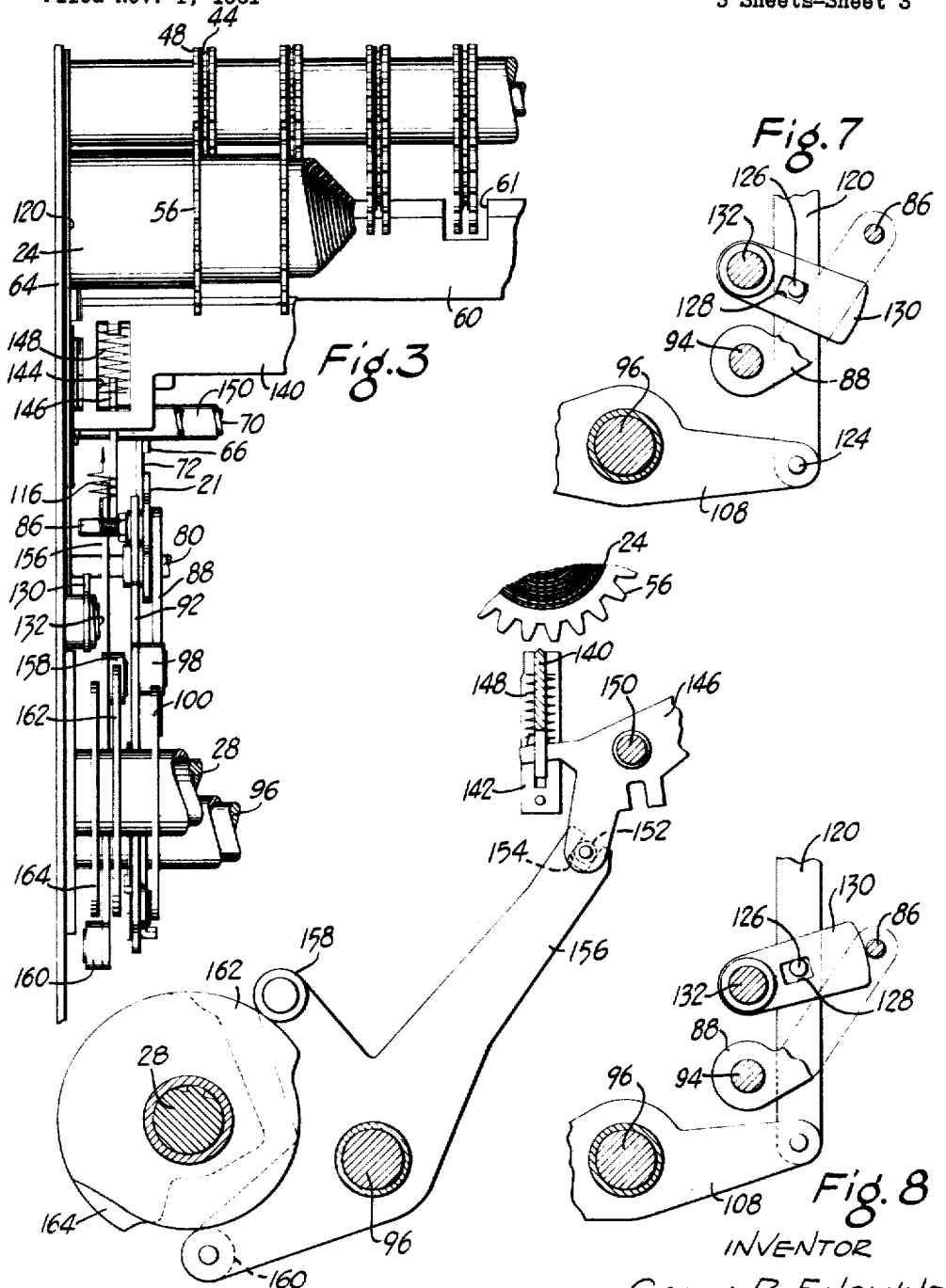

3,093,305
ACCOUNTING MACHINE
Gosta R. Englund, Stockholm, Sweden, assignor to Svenska Dataregister AB, Stockholm, Sweden, a corporation of Sweden
Filed Nov. 1, 1961, Ser. No. 149,446
Claims priority, application Sweden Nov. 4, 1960
14 Claims. (Cl. 235—60)

This invention relates to an accounting machine and, more particularly, to an accounting machine including new and improved means for entering data.

In accounting machines, such as cash registers, differential means are set to data representing positions under the control of banks of keys. This setting or the subsequent resetting of the differential means is effective to enter a data item into an accumulator or itemizer or to set suitable indicating means to positions corresponding to the entered data. In many applications, such as retail stores, it is sometimes necessary to make a plurality of identical data entries, and it would be desirable to effect these repeated entries of identical data items without requiring the repeated operation of the banks of keys.

In some prior devices, repeated data entries are obtained by locking the differential means to the indicating means at the end of each cycle of operation and maintaining this connection in the interval between successive cycles of operation. The indicating means then controls the setting of the connected differential means when the next cycle of operation of the accounting machine is initiated. However, this has the disadvantage of requiring the release of the connection between the differential means and the resetting of the indicating or recording means at the start of each cycle of operation in which a repeat operation is not desired.

Accordingly, one object of the present invention is to provide a new and improved accounting machine.

Another object is to provide an accounting machine including new and improved means for producing the repeated entry of data items into an accumulator under the control of an indicating assembly.

Another object is to provide an accounting machine having control means for selectively locking an indicating assembly during certain types of operation to permit a group of differential actuators to be set under the control of the locked indicating assembly.

Another object is to provide an accounting machine including a plurality of separate means for locking an indicating means and control means for selectively releasing the separate locking means.

In accordance with these and many other objects, an embodiment of the invention comprises an accounting machine or cash register including a plurality of differential means or assemblies that are set to data representing positions under the control of manually actuated keys in a plurality of banks thereof. The differential means are reset or returned to normal positions during each cycle of operation. During the setting or resetting movements, the differential means are effective to enter a data item into an engaged accumulator and to set suitable indicating means to positions corresponding to the entered data item. The indicating means are set by means, such as an indicator slide, that are not positively secured to the differential means and are free to remain in a set position between successive cycles of operation of the cash register. Thus, the indicating slides and the indicating means actuated thereby are adjusted from one set position to a new set position during successive cycles of operation of the cash register without being returned to a normal position incident to each of these cycles of operation.

To provide the repeated entry of identical data items, the cash register includes a first indicator locking means that is released during each cycle of operation and a second indicator locking means that is normally released to permit the position of the indicating assembly to be changed during successive cycles of operation. However, when the repeated entry of identical data items is desired, a control means selectively maintains the second locking means in an effective position so that the indicator slides are locked in position. When the cash register is placed in operation, the differential means are moved from their normal positions to the positions determined by the locked positions of the indicator slides and the data item previously entered, represented by the locked indicator slides, is again entered into an engaged accumulator. This operation can be repeated for as many cycles of operation as the second indicator locking means is maintained in an effective condition. In this manner, it is not necessary to maintain the indicating slides locked or connected to the differential means between successive cycles of operation, and the need for releasing and restoring the indicating slides during normal listing operations is obviated.

Many other objects and advantages in the present invention will become apparent from considering the following description in conjunction with the drawings in which:

FIG. 1 is a detail view of an accounting machine illustrating the repeat control entry means in a normal position;

FIG. 2 is a fragmentary detail view similar to FIG. 1 illustrating the repeat control means in an actuated condition;

FIG. 3 is a fragmentary elevational view of the repeat control means;

FIG. 4 is a detail view showing a portion of the repeat control means in a normal position;

FIG. 5 is a view similar to FIG. 4 illustrating the repeat control means in an actuated position when the cash register is not conditioned for a repeat operation;

FIG. 6 is a view similar to FIG. 4 showing the repeat control means in an actuated condition when the cash register is conditioned for a repeated entry;

FIG. 7 is a fragmentary view of another portion of the repeat control means shown in the normal position;

FIG. 8 is a view similar to FIG. 7 illustrating the repeat control means in an operated condition when the cash register is conditioned for a repeated entry; and FIG. 9 is a detail view of one locking means included in the repeat control means.

The repeat control means embodying the present invention is illustrated in conjunction with the details of a cash register, although it can be used with many other accounting machines of suitable constructions. The illustrated cash register includes an indicating assembly comprising a front line of indicator drums 20 (FIG. 1), a rear line of indicator drums 22, and a printing or recording means including a plurality of recording elements, such as type wheels, which are moved to and set in desired positions by a plurality of telescoping shafts 24. The cash register construction also includes one or a plurality of accumulators or itemizers for receiving, storing and discharging data. The indicating means including the wheels 20 and 22 and the printing assembly connected to the telescoping shafts 24, and the accumulator assembly are all actuated under the control of a plurality of differentially settable means or assemblies, indicated generally as 26, which are actuated by a main shaft 28 of the cash register under the control of manually actuated banks of keys (not shown).

The differential means 26 can be of the type shown and described in detail in the copending applications of Gosta R. Englund, Serial No. 633,947, filed January 14, 1957, now Patent No. 3,040,978, and Serial No. 6,522, filed February 3, 1960. As set forth therein, each of the plurality of differential means 26 includes an accumulator slide or rack 30 and a complementary slide or rack 32 which are moved in opposite directions by a pair of individually connected differential levers 34. The upper edges of the slides 30 and 32 are provided with projections that are moved into engagement with opposite sides of a depressed key stem so that the two slides are moved to complementary positions representing the digital value or data item corresponding to the manually depressed key. During the setting movement, the pair of differential levers 34 actuated by cams carried on the main shaft 28 move the accumulator slide 30 to the right (FIG. 1) and the complementary slide 32 to the left through a distance determined by the data item to be entered. During resetting movement, the differential levers 34 move the slides 30 and 32 in opposite directions. A value is listed in or read out of an itemizer or accumulator engaged by toothed portions (not shown) on the lower edges of the accumulator slides or racks 30 by selectively moving the accumulator gears into engagement with the toothed portions on the racks during either the setting or resetting movements of the slides.

To provide means for setting the indicating drums 20 and 22 and the telescoping shafts 24 to positions corresponding to the set positions of the differential assemblies 26, each of the differential means 26 includes an indicator slide or rack 36 disposed between the slides 30 and 32 and loosely coupled thereto by cooperating projections on the indicator rack 36 that bear against aligned projections on the slides 30 and 32. This mechanical coupling is such that the indicator slide 36 is not rigidly secured to either of the slides 30 and 32, but is pulled or pushed by one of these slides from a prior setting to a new setting each time that the differential means 26 is set. Accordingly, the indicator slide 36 is not restored to a normal position during each cycle of operation, but is advanced to the right or the left (FIG. 1) in dependence on the successive values entered into the differential means 26.

As indicated above, the indicator rack 36 in each of the differential means 26 adjusts the settings of the indicator drums 20 and 22 and the telescoping shaft 24 to positions corresponding to that of the differential means 26. To accomplish this, the upper edge of the right end of each of the indicator slides 36 is provided with a toothed portion 36a that directly engages a gear 38 which is secured to the related indicator drum 20 and which is rotatably mounted on a shaft 40. The indicator rack 36 is indirectly coupled to the drums 22 and the telescoping shafts 24 through a transfer wheel assembly indicated generally as 42.

Each of the transfer wheel assemblies 42 includes a wheel or gear 44 which is rotatably mounted on a shaft 46 and which engages a toothed portion 36b formed on the lower edge of the right end of the indicator slide 36. The wheel 44 is disposed between a pair of adjacent toothed wheels or gears 48 and 50 which are also rotatably mounted on the shaft 46. The wheel 50 is connected to the driven wheel 44 by a tongue 50a that is received within a notch formed in the wheel 44, and the wheel 48 is similarly connected to the wheel 44 by a tongue 48a that is received within a notch in the wheel 44. The wheel 50 meshes with a gear 52 which is secured to the indicator drum 22 and which is rotatably mounted on a shaft 54. The wheel 48 meshes with a gear 56 (FIGS. 1 and 3) that is secured to one of the telescoping shafts 24. When the indicator rack 36 is moved either to the right or to the left to a position corresponding to the set position of the related differential means 26, the toothed portion 36a sets the indicator drum 20 to a corresponding position, and the toothed portion 36b drives the wheel 44 so that the wheels 50 and 48 set the drum 22 and the related telescoping shaft 24, respectively, to corresponding positions.

The repeat control means controls the successive or repeated entry of identical data items into the cash register by selectively locking the transfer wheel assemblies 42 against movement in those cycles of operation of the cash register in which repeated data entries are desired. By locking the transfer wheel assemblies 42, the indicator slides 36 are locked in position, and the projections thereon engage the cooperating projections on the accumulator slides 30 and the complementary slides 32 to position these slides in positions corresponding to their previous settings represented by the locked indicator slides 36. This is accomplished without requiring the depression of the amount and selector keys in the related banks. When a repeat entry operation is not desired, the transfer wheel assemblies 42 are freed for movement so that the slides 30 and 32 can be set under the control of depressed keys to adjust the indicator slides 36 and the components driven thereby to new settings.

The repeat control assembly includes an elongated locking rail 60 (FIGS. 1-3) that is slidably mounted in a pair of guides on the frame of the cash register, such as a guide 62 secured to a wall 64 (FIG. 3). The upper edge of the rail 60 is normally received between two adjacent teeth on the gears or wheels 48 and 50 to lock the assemblies 42 and the slides 36 against movement. The upper edge of the rail 60 can be provided with notches or recesses 61 (FIG. 3) for the transfer wheel assemblies 42 associated with any of the differential assemblies 26 that are not to be locked in position during a repeat control operation. As an example, the locking rail 60 can be provided with a notch or recess 61 for the transfer wheel assembly 42 driven by the mode of operation or function selecting differential assembly 26. A depending portion 60a (FIG. 1) of the rail 60 is provided with an opening in which one arm of a lever 66 is disposed with a compression spring 68 interposed between the upper edge of this opening and a projection formed on an upper edge of the lever 66. The compression spring 68 normally biases the locking rail 60 to the locking or effective position shown in FIG. 1.

The lever 66 is pivotally mounted on a shaft 70 and is pivotally connected to a link 72 by a pivot pin 74. The other end of the link 72 is pivotally connected to the one end of a lever 76 by a pivot pin 78. The lever 76 is pivotally mounted on a shaft 80 and is provided with a slot 82 at one end. A roller 84 mounted on a shaft 86 that is carried by an arm 88 extends through the slot 82 and is received within an upwardly open notch 90 formed in the upper end of a cam follower lever 92. The arm 88 is carried on a shaft 94, and the lever 92 is pivotally mounted on a shaft 96. The cam follower lever 92 carries a roller 98 that engages the outer periphery of a cam 100 which is keyed to the main shaft 28.

This mechanism is normally effective to move the locking rail 60 from its locking position to an ineffective or released position during each cycle of operation of the cash register and is selectively rendered ineffective to retract the locking rail 60 when a repeated entry controlled by the indicator slides 36 is to be performed. To selectively render this drive mechanism effective and ineffective a plate 102 is pivotally mounted on one end of the lever 92 by a pivot pin 104. A depending flange 102a on the plate 102 extends through an opening 106 in the lever 92 to engage an end portion 108a (FIGS. 4–6) on a lever 108 that is pivotally mounted on the shaft 96. A tension spring 110 connected between a pin 112 on the lever 108 and a flange on the plate 102 normally biases the depending portion 102a into engagement with the end portion 108a.

When the cash register is placed in operation and a repeat operation is not to be performed, the repeat control assembly is disposed in the position shown in FIGS. 1 and 4. The main shaft 28 rotates in a clockwise direction, and a pin 114 carried on the cam 100 moves into engagement with an indentation on the plate 102. The continuing movement of the main shaft 28 forces the pin 114 against the plate 102 and pivots this plate in a clockwise direction about the pivot pin 104 to the position shown in FIGS. 2 and 5, the depending flange 102a sliding into engagement with the projecting portion 108a on the lever 108. This movement of the pin 114 and the plate or pawl 102 pivots the lever 92 in a counterclockwise direction about the shaft 96 from the normal position shown in FIG. 1 to the displaced position shown in FIG. 2.

During this movement of the lever 92, the shaft or pin 86 and the roller 84 carried thereon are displaced to the left within the slot 82 so that the lever 76 is pivoted in a counterclockwise direction about the shaft 80. This movement is effective through the link 72 to pivot the lever 66 in a clockwise direction about the shaft 70 to move the locking rail 60 downwardly. This permits the adjustment of the transfer wheel assemblies 42 by the indicator racks 36 of the differential means 26. A tension spring 116 connected between the frame of the cash register and the shaft or pin 86 holds the actuating linkage for the rail 60 in the position shown in FIG. 2 until after the setting of the differential assemblies 26 is completed. At this time, the edge of the cam 100 engages the roller 98 to pivot the lever 92 in a clockwise direction from the actuated position shown in FIG. 2 to the normal position shown in FIG. 1. This returns the connected linkages to their normal positions and moves the locking rail 60 into engagement with the transfer wheel assemblies 42 to lock these assemblies until the next cycle of operation.

Thus, when the repeat control assembly is not used, the transfer wheel assemblies 42 are freed for rotation, and the indicator slides 36 and the differential assemblies 26 can be actuated by the main drive shaft 28 to positions determined by the manually depressed keys. When a repeat operation is to be performed, the operating mechanism for releasing the locking rail 60 is disabled, and the selected transfer wheel assemblies 42 are locked against movement. This, in turn, locks the indicator slides 36 in their positions to which they were set during the preceding cycle of operation. Thus, the differential means 26 are now set free of control by the manual keys and in dependence on the settings of the locked indicator slides 36, the positions of which represent the data item that is to be repeatedly entered. A repeat operation is initiated by depressing a repeat key 118 (FIG. 1) which also can be used to start the drive motor for the cash register.

The key 118 is connected to the upper end of a link 120 by a pivotally mounted arm 122 so that when the key 118 is depressed, the link 120 is moved upwardly. The lower end of this link is pivotally connected to the lever 108 by a pivot pin 124. When the link 120 is moved upwardly, the lever 108 is pivoted in a counterclockwise direction about the shaft 96 from the normal position shown in FIG. 4 to the operated position shown in FIG. 6. This pivotal movement of the lever 108, by engagement with the depending flange or lug 102a, pivots the pawl plate 102 in a clockwise direction about the pivot pin 104 so that, as shown in FIG. 6, the plate 102 is no longer in the path of movement of the pin 114. Therefore, when a cycle of operation of the cash register is initiated and the main shaft 28 moves in a clockwise direction, the pin 114 passes by the plate 102, and the above described mechanism for releasing the latching rail 60 is not operated.

In those banks of the cash register in which a recess 61 in the rail 60 is not provided for the related transfer wheel assembly 42, the transfer wheel assemblies are locked against movement. This means that the slides or racks 30 and 32 are set by engagement with the projections on the fixed indicator rack or slide 36 to enter the same data item previously entered into the cash register and stored in the positions of the locked indicator racks 36. The setting of the differential means 26 causes the entry of the repeated data item in the itemizer or accumulator. When the link 120 is restored to its normal position, the plate 102 is again moved back into the path of movement of the pin 114 by the tension spring 110 so that the locking rail 60 can be released in the manner described above on a subsequent cycle of operation.

The repeat control assembly also includes means for preventing the actuation of the control linkage for the locking rail 60 by the spring 116 when the lever 92 is not pivoted by the pawl plate 102 during a repeat operation. This is necessary because the configuration of the cam 100 is such that the cam follower lever 92 is freed for counterclockwise movement about the shaft 96 during each cycle of rotation of the main shaft 28. To accomplish this, the link 120 carries a pin 126 (FIGS. 1, 7 and 8) that is disposed within an opening 128 in an arm 130 that is pivotally mounted on a shaft 132. In the normal position of the link 120 shown in FIG. 7, the free end of the arm 130 is held out of the path of movement of the pin or shaft 86. Thus, the lever 92 normally can be pivoted in a counterclockwise direction about the shaft 96 to actuate the mechanism for releasing the locking rail 60.

However, when the link 120 is elevated to the actuated position shown in FIG. 8, the pin 126 bears against the upper edge of the opening 128 and pivots the arm 130 in a counterclockwise direction about the shaft 132 to position the end of the arm 130 in the path of movement of the shaft or pin 86. This prevents the counterclockwise movement of the cam follower lever 92 under the force supplied by the tension spring 116 when the cam follower lever 92 is freed for pivotal movement by the cam 100. The restoration of the key 118 and the link 120 to the normal position shown in FIG. 7 again permits the locking rail 60 to be released.

The cash register also includes an additional means for locking and aligning all of the transfer wheel assemblies 42 in the indicating means. It is desirable to provide this additional means because, as indicated above, some of the transfer wheel assemblies may not be locked by the rail 60. The additional locking means is released during each cycle of operation of the cash register. This locking and aligning means includes a locking rail 140 (FIGS. 1, 3 and 9) mounted in a pair of end guides 142 carried on the side walls of the main frame of the cash register, such as the wall 64. The rail 140 is disposed beneath the gears or wheels 56 and is adapted to move into and out of engagement with the teeth thereon to align and lock both the type wheels set by the shafts 24 and also the engaged transfer wheel assemblies 42.

The locking rail 140 is moved to an ineffective or released position prior to the operation of the differential means 26 and is restored to an effective locking position following the setting thereof. To accomplish this, one end of the rail 140 is provided with an opening 144 (FIG. 3) into which extends one end of a lever 146. A compression spring 148 interposed between the upper edge of the opening 144 and the upper edge of the lever 146 normally biases the locking rail 140 to the effective or locking position shown in FIGS. 1 and 3. The lever 146 is pivotally mounted on a shaft 150 (FIG. 9) and carries a roller or pin 152 that is disposed within an upwardly open notch 154 in a cam follower lever 156. This lever is pivotally mounted on the shaft 96 and includes a pair of cam follower rollers 158 and 160 that engage two cams 162 and 164, respectively, keyed to the main shaft 28.

When a cycle of operation of the cash register is initiated, the rotation of the cams 162 and 164 during an initial portion of the cycle of operation pivots the lever 156 in a clockwise direction about the shaft 96 so that the lever 146 is pivoted in a counterclockwise direction about the shaft 150. The portion of the lever 146 disposed within the opening 144 in the rail 140 bears against the lower edge of this opening and moves the rail 140 from the effective locking position shown in FIG. 1 to the released position shown in FIG. 9. This permits the telescoping shafts 24 and the wheel assemblies 42 to be adjusted to positions representing the items of information entered by the differential means 26. As soon as the differential means 26 have been set, the cams 162 and 164 engage the rollers 158 and 160 to pivot the lever 156 in a counterclockwise direction about the shaft 96 to restore the locking rail 140 to its effective position.

Although the invention has been described with reference to one illustrative embodiment thereof, it should be understood that numerous other modifications and other embodiments can be devised by those skilled in the art that will fall within the spirit and scope of the principles of this invention.

What is claimed and desired to be secured by Letters Patent of the United States is:

1. In an accounting machine including an accumulator, differential means movable to different data representing settings and operable to enter a data item in said accumulator, indicating means movable to different settings corresponding to the data representing settings of the differential means, coupling means connected to said indicating means and engaged by said differential means to transfer the setting of said differential means to said indicating means, said differential means being movable in opposite directions to a data representing setting and to a normal setting during an operation of said machine, said coupling means being engaged by said differential means only during movement of said differential means in a setting direction, and means for selectively locking said indicating means and the connected coupling means in a previous setting during selected operations of said machine so that said differential means is set in a data representing setting by engagement with said coupling means to enter a data item in said accumulator that is identical to the data item entered in said previous setting.

2. In an accounting machine, differential means movable to different data representing settings, indicating means movable to different settings corresponding to the data representing settings of the differential means, coupling means connected to said indicating means and engaged by said differential means to transfer the setting of said differential means to said indicating means, said differential means being movable in one direction to a data representing setting and in an opposite direction to a normal setting during an operation of said machine, said coupling means being engaged by said differential means only during movement in said one direction to said data representing position so that said indicating means is only moved from one data representing setting to a new data representing setting and is not returned to a normal setting during each cycle of operation of said machine, and means for selectively locking said indicating means and the connected coupling means in a previous setting during selected operations of said machine so that said differential means is set in a data representing setting by engagement with said coupling means.

3. In an accounting machine, differential means movable to different data representing settings, said differential means including a pair of oppositely moving differential elements, indicating means movable to different settings corresponding to the data representing settings of the differential means, coupling means connected to said indicating means and adapted to be selectively engaged and moved in opposite directions by said two differential elements to transfer the setting of said differential means to said indicating means, and means for selectively locking said coupling means in a previous setting during selected operations of said machine so that said coupling means provides stop means for setting said two differential elements in data representing settings by engagement with said coupling means.

4. In an accounting machine, differential means movable to different data representing positions, indicating means actuated by said differential means to positions corresponding to the positions of the differential means, locking means for normally locking said indicating means in said positions, first control means for releasing said locking means during each cycle of operation of said accounting machine to permit the indicating means to be moved under the control of said differential means, and second control means for rendering said first control means ineffective so that said locking means locks said indicating means against movement during a cycle of operation of said accounting machine.

5. In an accounting machine, differential means movable to different data representing positions, indicating means actuated by said differential means to positions corresponding to the positions of the differential means, locking means for normally locking said indicating means in said positions, cam means operable during each cycle of operation of said machine, actuating means operated by said cam means for releasing said locking means during each cycle of operation of said machine, and control means manually operable to render said cam means and actuating means ineffective to release said locking means during a selected cycle of operation of said machine.

6. In an accounting machine, a plurality of differential means operable to different data representing settings, a plurality of indicating means actuated by said differential means to corresponding data representing settings, first locking means for locking all of said plurality of indicating means in said data representing positions, second locking means for locking less than all of said plurality of indicating means in said data representing positions, drive means for releasing said first and second locking means during a cycle of operation of said machine, and control means for rendering said drive means effective to release different ones of said first and second locking means.

7. The accounting machine set forth in claim 6 in which said second locking means includes a common latching means having a pattern of recessed portions corresponding to the combination of indicating means that are not to be locked by the said second locking means.

8. In an accounting machine, a plurality of differential means operable to different data representing settings, a plurality of indicating means actuated by said differential means to corresponding data representing settings, first locking means including a first locking element movable into engagement with all of said plurality of indicating means for normally locking said indicating means in said data representing settings, second locking means including a second locking element movable into engagement with less than all of said plurality of indicating means for normally locking less than all of said indicating means in said data representing settings, actuating means for releasing said first and second indicating means during each cycle of operation of said machine, and control means operable to prevent the release of at least one of said first and second locking means during a selected cycle of operation of said machine.

9. In an accounting machine, a plurality of differential means operable to different data representing settings, a plurality of indicating means actuated by said differential means to corresponding data representing settings, first locking means for locking all of said plurality of indicating means in said data representing positions, second locking means for locking less than all of said plurality of indicating means in said data representing positions, drive means for releasing said first and second locking means during a cycle of operation of said machine, and control means for rendering said drive means effective to release said first locking means during each operation of said machine and effective to release said second locking means during selected ones of the operation of said machine.

10. In an accounting machine including manually operable keys, differential means operable to different spaced data representing positions during successive cycles of operation of said machine, indicating means connected to said differential means and operable to corresponding data representing positions to visibly display said data, locking means operable at the end of each cycle of operation of said machine to lock said indicating means in said data representing positions, and manually controlled means operable at the beginning of the cycle of operation for selectively rendering said locking means effective or ineffective to lock said indicating means during the following cycle of operation so that said differential means are set by said manually operable keys when said locking means are ineffective and are set by said indicating means when said locking means are effective.

11. In an accounting machine including manually operable keys, differential means operable to different spaced data representing positions during successive cycles of operation of said machine, means for visibly displaying the represented data, connecting means between said differential means and said indicating means for operating said indicating means to a setting corresponding to the position of said differential means, said connecting means providing a loose coupling between said indicating means and said differential means so that said indicating means is directly moved from a setting representing the position of the differential means during the preceding cycle of operation to a position representing the position of the differential means in the next cycle of operation without passing through a normal position, locking means for normally locking the indicating means in the selected setting at the end of each cycle of operation, and manually controlled means operable at the beginning of a cycle of operation for selectively operating said locking means to an ineffective setting or retaining said locking means in an effective setting, said differential means being positioned under the control of said keys when said locking means is operated to an ineffective setting and being positioned by said connecting means when said locking means is in an effective setting.

12. In an accounting machine, differential means including a pair of side-by-side differential elements mounted for parallel translatory movement to different data representing settings, indicating means movable to different settings corresponding to the data representing settings of the differential means to visibly display the data, coupling means connected to said indicating means and engaged by said differential elements to transfer the setting of said differential means to said indicating means, the two elements of the differential means being moved relative to each other in one direction to a data representing setting and being moved relative to each other in an opposite direction to a normal setting during an operation of said machine, said coupling means being engaged and moved to a data representing setting by only one or the other of the differential elements during movement in only said one direction so that said indicating means is moved only from one data representing setting to a new data representing setting and is not returned to a normal setting during each cycle of operation of said machine, first and second locking means for locking said indicating means and the connected coupling means in their settings at the end of a cycle of operation, first releasing means for releasing the first locking means at the beginning of each cycle of operation of the machine, and second releasing means including manually adjustable means for releasing said second locking means only during selected operations of said machine so that said differential means is set in a data representing setting by engagement with said coupling means during those cycles of operation in which the first locking means is released and the second locking means is not released.

13. In an accounting machine, a plurality of differential means each movable to different data representing settings, a plurality of indicating means each movable to one of a number of different settings corresponding to the data representing settings of the differential means, a plurality of coupling means each connected to one of the indicating means and each engaged by one of the differential means to transfer the setting of the differential means to the related indicating means, each of said differential means being movable in one direction to a data representing setting and is not returned to a normal setmal setting during an operation of said machine, said coupling means being engaged by said differential means only during movement in said one direction to said data representing position so that said indicating means is only moved from one data representing setting to a new data representing setting and is not returned to a normal setting during each cycle of operation of said machine, first locking means for locking all of the indicating means and the connected coupling means in their data representing settings, second locking means for locking less than all of the indicating means and the connected coupling means in their data representing settings, drive means for releasing said first and second locking means during a cycle of operation of said machine, and control means for rendering said drive means effective to release different ones of said first and second locking means.

14. The accounting machine set forth in claim 13 including toothed means movable with the connected coupling means and indicating means, and a common latching rail included in said second locking means and movable into and out of engagement with said toothed means, said latching rail including recessed portions corresponding to the ones of the indicating means that are not to be locked.

References Cited in the file of this patent
UNITED STATES PATENTS

| | | |
|---|---|---|
| 789,408 | Carroll | May 5, 1905 |
| 1,994,211 | Crossman | Mar. 12, 1935 |
| 2,034,345 | Kottman | Mar. 17, 1936 |
| 3,026,030 | Gelling | Mar. 20, 1962 |

UNITED STATES PATENT OFFICE
CERTIFICATE OF CORRECTION

Patent No. 3,093,305                                  June 11, 1963

Gosta R. Englund

It is hereby certified that error appears in the above numbered patent requiring correction and that the said Letters Patent should read as corrected below.

Column 10, line 26, for "and is not returned" read -- and in an opposite direction --.

Signed and sealed this 24th day of December 1963.

(SEAL)
Attest:

ERNEST W. SWIDER
Attesting Officer

EDWIN L. REYNOLDS

Acting Commissioner of Patents